(12) United States Patent
Medlyn

(10) Patent No.: US 9,524,193 B1
(45) Date of Patent: Dec. 20, 2016

(54) TRANSPARENT VIRTUALIZED OPERATING SYSTEM

(71) Applicant: CA, Inc., New York, NY (US)

(72) Inventor: Dayne Howard Medlyn, Windsor, CO (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/849,239

(22) Filed: Sep. 9, 2015

(51) Int. Cl.
*G06F 13/00* (2006.01)
*G06F 9/50* (2006.01)

(52) U.S. Cl.
CPC ........... *G06F 9/5077* (2013.01); *G06F 9/5016* (2013.01)

(58) Field of Classification Search
CPC ...... G06F 9/45533; G06F 9/4843; G06F 9/52; G06F 9/541
USPC .............. 718/1, 100, 106; 719/319
See application file for complete search history.

(56) References Cited

U.S. PATENT DOCUMENTS

| | | | | |
|---|---|---|---|---|
| 5,692,192 A * | 11/1997 | Sudo | ..................... | G06F 9/5088 711/147 |
| 7,140,015 B1 * | 11/2006 | Bhanjois | ................. | G06F 9/546 718/100 |
| 8,776,050 B2 | 7/2014 | Plouffe et al. | | |
| 8,898,542 B2 * | 11/2014 | Leggette | ................. | H04L 67/10 713/193 |
| 9,049,193 B2 * | 6/2015 | Mai | ......................... | H04L 67/10 |
| 2005/0044301 A1 * | 2/2005 | Vasilevsky | .......... | G06F 9/45533 711/1 |
| 2013/0067267 A1 | 3/2013 | Tamhane et al. | | |
| 2015/0040134 A1 * | 2/2015 | Leggette | ............. | H04L 67/1097 718/103 |

* cited by examiner

*Primary Examiner* — Andy Ho
(74) *Attorney, Agent, or Firm* — Baker Botts L.L.P.

(57) ABSTRACT

A method for deploying an application task across a distributed operating system is described. The method comprises receiving a request to deploy an application task from a main operating system on a main system to a distributed operating system, wherein the main system comprises a master cell, wherein the distributed operating system comprises a plurality of individual virtual cells, each individual virtual cell comprising a microkernel architecture and a portion of the distributed operating system. The method comprises detecting, via the master cell, a resource availability of each of the individual virtual cells and determining which of the individual virtual cells comprises an infrastructure necessary to perform the application task. The method comprises selecting at least one of the individual virtual cells to perform the application task based on the resource availability and infrastructure of the individual virtual cell, and instructing the selected individual virtual cell to perform the application task.

20 Claims, 4 Drawing Sheets

TRANSPARENT VIRTUALIZED OPERATING SYSTEM

BACKGROUND

The present disclosure relates to interfaces and, in particular, to a system, a computer program product, and method for deploying an application task on a distributed operating system.

SUMMARY

According to an embodiment of the present disclosure, a method is disclosed comprising receiving a request to deploy an application task from a main operating system on a main system to a distributed operating system, wherein the main system comprises a master cell, wherein the distributed operating system comprises a plurality of individual virtual cells, each individual virtual cell comprising a microkernel architecture and a portion of the distributed operating system, and wherein each individual virtual cell is configured to perform application tasks from the main system. The method further comprising detecting, via the master cell, a resource availability of each of the plurality of individual virtual cells, and determining which of the plurality of individual virtual cells comprises an infrastructure necessary to perform the application task. The method further comprising selecting at least one of the plurality of individual virtual cells to perform the application task based on the resource availability and infrastructure of the at least one of the plurality of individual virtual cells, and instructing the selected at least one of the plurality of individual virtual cells to perform the application task.

According to another embodiment of the present disclosure, a processing system configured to perform the aforementioned method.

According to another embodiment of the present disclosure, a computer program product comprising a computer-readable storage medium having computer-readable program code embodied therewith, the computer-readable program comprising computer-readable program code configured to perform the aforementioned method.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-4, like numerals being used for corresponding parts in the various drawings.

DETAILED DESCRIPTION

Figure 1:
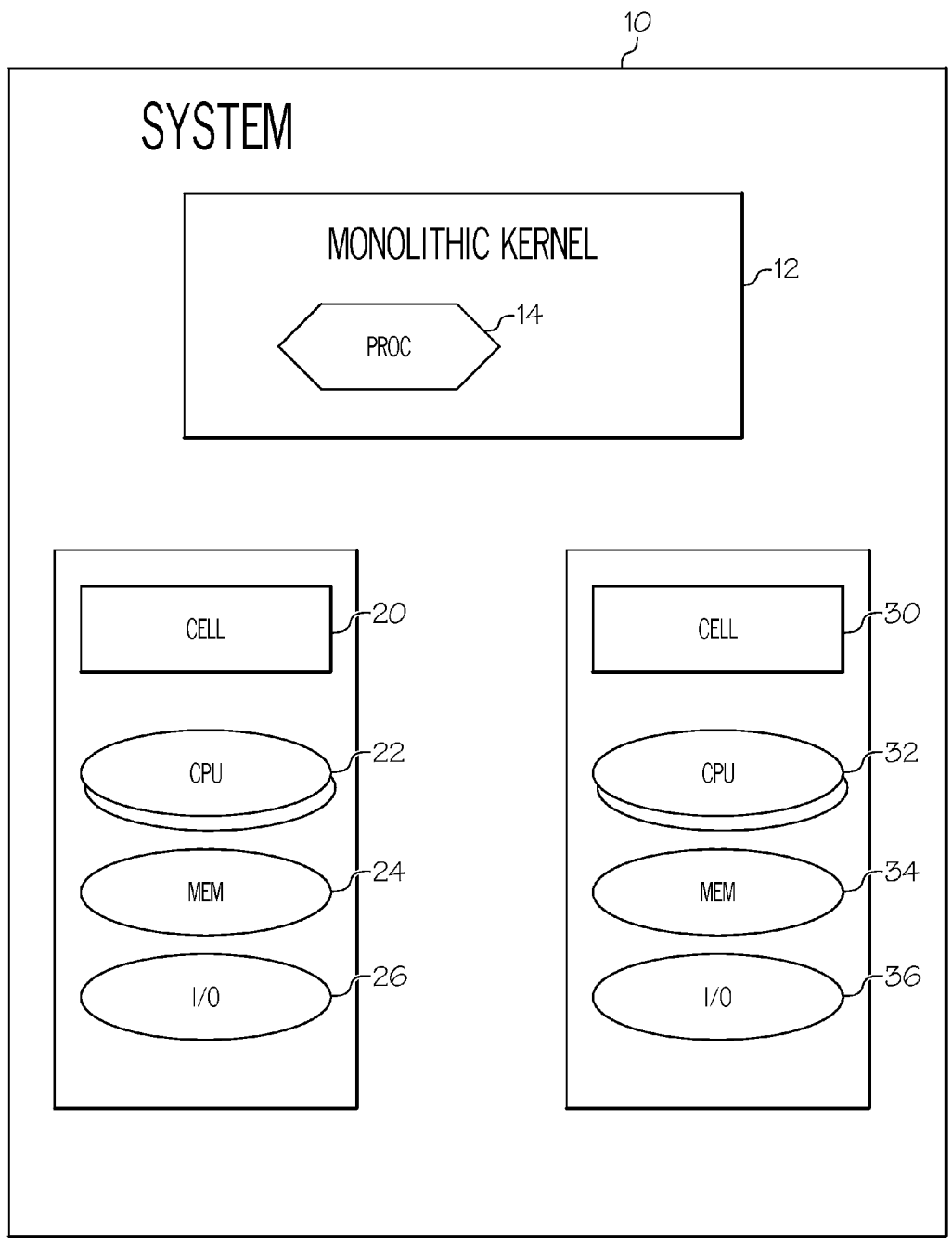
FIG. 1 illustrates cell-based architecture system of a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Non-uniform memory access (NUMA) is a computer memory design used in multiprocessing, where the memory access time depends on the memory location relative to the processor. Under NUMA, a processor can access its own local memory faster than non-local memory (e.g., memory local to another processor or memory shared between processors). Known distributed operating system efforts have been unsuccessful in distributing purely monolithic kernels or purely microkernel implementations across multiple hardware nodes. A monolithic kernel may be an operating system architecture where the entire operating system is working in kernel space and the monolithic kernel may define a high-level interface over computer hardware. A microkernel may provide the near minimum amount of software that can provide support to implement an operating system.

End users desire to implement applications across computer operating systems according to their business needs. Current virtualization technologies require deployment of a traditional operating system on virtualized hardware before executing an application on the hardware. In other words, virtualized hardware often includes unnecessary resources, resulting in cost inefficiencies. In addition, virtualized hardware frequently includes operating systems that require continuous maintenance and patching.

Accordingly, there is a need in the marketplace for a virtualized operating system with transparent underlying infrastructure such that an application process may be efficiently deployed across the virtualized operating system. Instead of incurring additional overhead by supporting unnecessary resources, the present disclosure is able to schedule application processes based on the properties of an underlying infrastructure of the virtualized operating system. The present disclosure applies the concepts of NUMA to a distributed computer system. This unique solution may be extended to applications, databases, storage, etc. Embodiments of the present disclosure may address the above problems, and other problems, individually and collectively.

FIG. 1 illustrates cell-based architecture system of a non-limiting embodiment of the present disclosure. FIG. 1 depicts a cell-based architecture system 10 and a monolithic kernel 12 with cells 20 and 30, all contained within a non-distributed computer system. A process 14 may be executed on cells 20 and 30 according to instructions from the monolithic kernel 12. Cell 20 may include CPU 22, memory 24, and I/O 26. Cell 30 may include CPU 32, memory 34, and I/O 36. If the process 14 requires memory 24 for proper execution, the monolithic kernel may assign the process 14 to cell 20. Additionally, if the process 14 requires memory 34 for proper execution, the monolithic kernel may assign the process 14 to cell 30.

Figure 2:
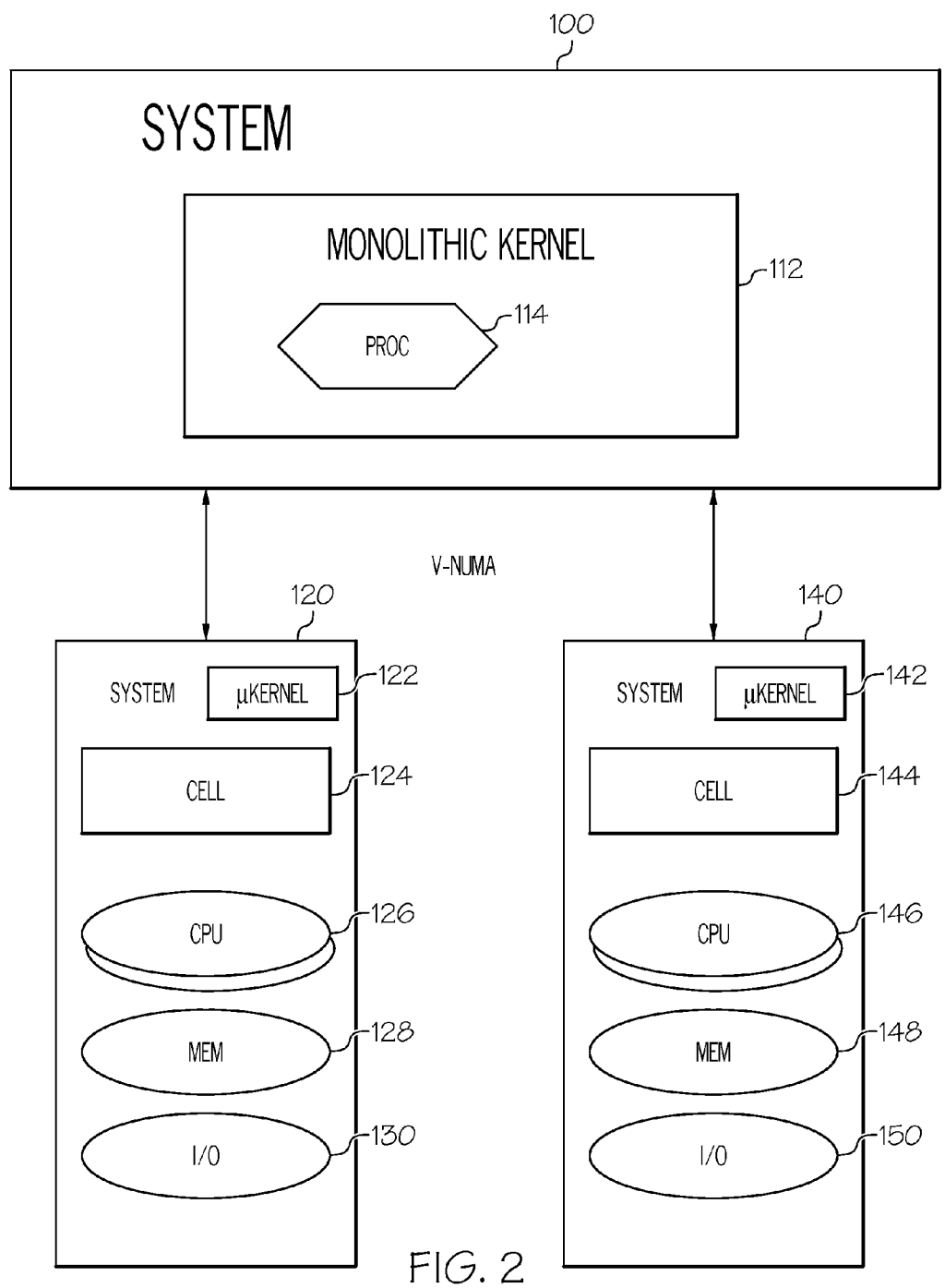
FIG. 2 illustrates a virtualized cell-based architecture system of a non-limiting embodiment of the present disclosure.

FIG. 2 illustrates a virtualized cell-based architecture system of a non-limiting embodiment of the present disclosure. The system 100 in FIG. 2 may include a monolithic kernel 112 with a process 114. The monolithic kernel 112 may be connected to virtual system cell 120 and virtual system cell 140 via a virtual network. Virtual system cells 120 and 140 may be a self-contained operating system based on a microkernel architecture providing a subset of the functions of a main system or master cell. In addition, virtual system cells 120 and 140 may be implemented to perform application tasks from a main system or master cell. Virtual system cells 120 and 140 may also be physical or virtual systems that virtualize the functions of the monolithic operating system. All systems may be connected via a physical network. Examples of virtual machine systems and networks include, but are not limited to, services such as VMware, Hyper-V, KVM, and Citrix Xen.

In some instances, the monolithic kernel 112 may be considered a master cell. Virtual system cell 120 may comprise microkernel 122, cell 124, CPU 126, memory 128, and I/O 130. Virtual system cell 140 may comprise microkernel 142, cell 144, CPU 146, memory 148, and I/O 150. In some non-limiting embodiments, each virtual system cell (e.g., 120 and 140) may comprise identical microkernel architecture. In other non-limiting embodiments, each virtual system cell may comprise microkernel architecture designed according to desired functionality.

The present disclosure may implement NUMA functionality on each node in a cluster using a microkernel. A monolithic kernel may schedule processes on virtual NUMA (vNUMA) cells, treating them as if they were the same as a NUMA cell in a physical NUMA cell architecture. As illustrated in FIG. 2, the vNUMA architecture simplifies deployment of applications because the functionality of each virtual system cell 120 and 140 are transparent to the monolithic kernel 112 and system 100. In addition, because each virtual system cell 120 and 140 will not have unnecessary resources, there is low process overhead for the system 100. In one non-limiting embodiment, virtual system cell 120 may be a laptop and virtual system cell 140 may be a desktop computer, both connected to the system 100 via a virtual network. However, virtual cells often are able to complete multiple functions without an associated operating system to add overhead expense.

Instead of dispatching programs locally, the monolithic kernel 112 may dispatch application tasks to virtual system cells (i.e., 120 or 140) that have appropriate resources to complete said tasks. The appropriate resources may include, for example, appropriate processing power, CPU, memory storage, information stored on memory, I/O, etc. As such, monolithic kernel 112 functions may be implemented in a microkernel (i.e., 122 or 142) running on each virtual node or cell of a cluster of virtual system cells, wherein a master operating system, such as, for example, Linux or Windows, may schedule processes on the virtual node or cell. In some non-limiting embodiments, the monolithic kernel 112 may be Windows.

The monolithic kernel 112 may schedule process on these virtual nodes or cells, treating them as if they were the same as a NUMA cell in a physical NUMA cell architecture. These virtual nodes or cells (e.g., 124 and 144) may include general purpose computer resources. Moreover, because these nodes or cells may be virtual, they may not need to be in the same location as the monolithic kernel 122. Nonetheless, interaction with these virtual cells or nodes may be the same as if they were in the same physical location.

Furthermore, these virtual cells or nodes may not have a traditional operating system to manage individual local resources. In some non-limiting embodiments, these virtual cells or nodes may have a portion of a distributed operating system, implemented in a microkernel, to provide process execution functions that may be scheduled and used by a monolithic kernel. In other non-limiting embodiments, these virtual cells or nodes may fulfill application requests of an overarching operating system without having a portion of a distributed operating system on the virtual cells or nodes.

Figure 3:
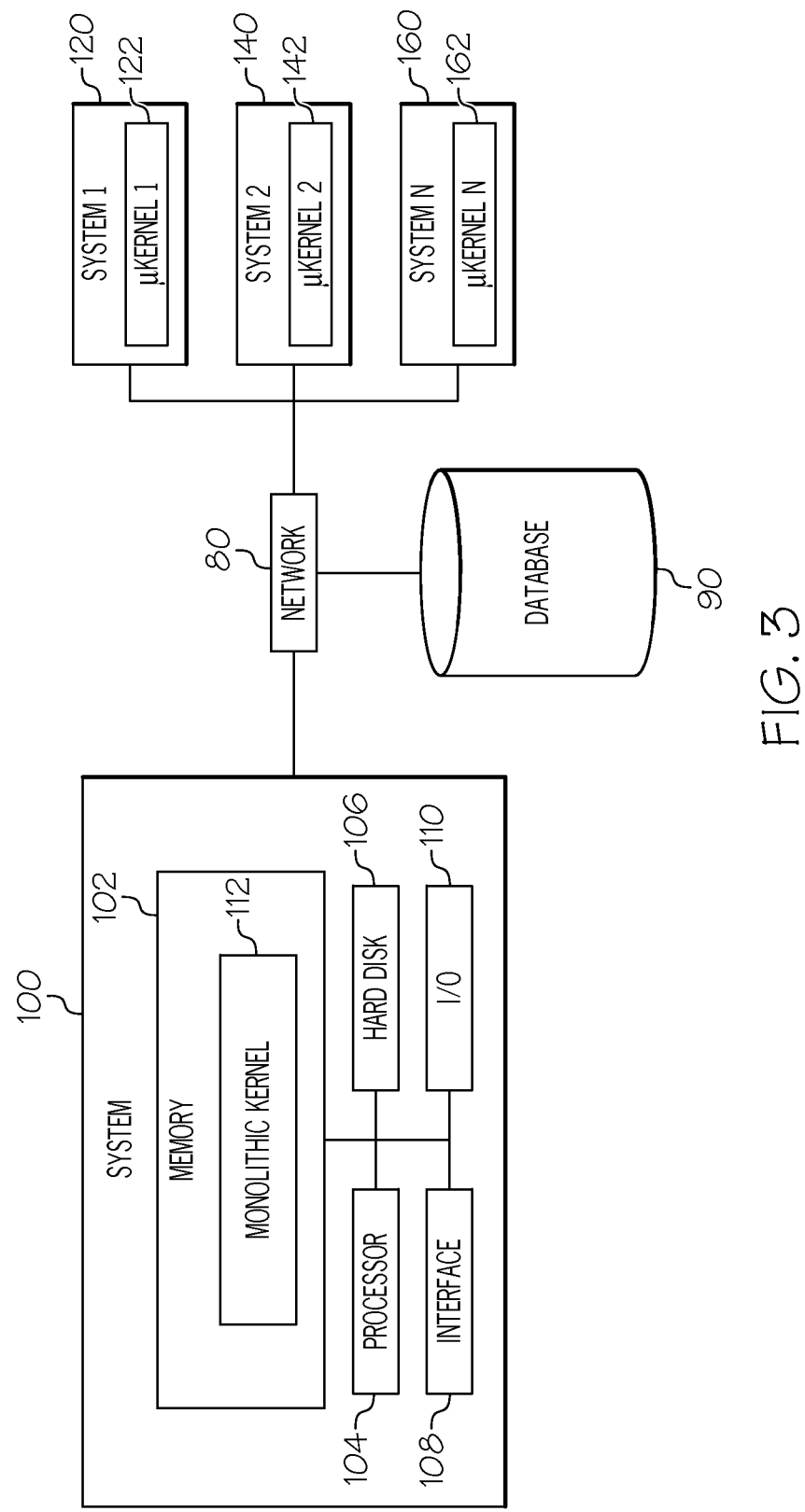
FIG. 3 illustrates an application management ecosystem for a virtualized operating system of a non-limiting embodiment of the present disclosure.

FIG. 3 illustrates an application management ecosystem for a virtualized operating system of a non-limiting embodiment of the present disclosure. A system 100 may include a memory 102, a monolithic kernel 112, a processor 104, a hard disk 106, an interface 108, and an input and output ("I/O") device 110. Application management analysis may take place on the monolithic kernel 112 shown in FIG. 3. Processor 104 may be operable to load instructions from hard disk 106 into memory 102 and execute those instructions according to monolithic kernel 112. Memory 102 may store computer-readable instructions that may instruct the monolithic kernel 112 to perform certain processes. I/O device 110 may receive one or more of data from another server or a network 80. The system 100 may be considered a processing system. Furthermore, monolithic kernel 112 may perform analysis on any processing system, wherein the processing system comprises one or more processors.

Network 80 may comprise one or more entities, which may be public, private, or community based. Network 80 may permit the exchange of information and services among users/entities that are connected to such network 80. In certain configurations, network 80 may be a local area network, such as an intranet. Further, network 80 may be a closed, private network/cloud, in certain configurations, and an open network/cloud in other configurations. Network 80 may facilitate wired or wireless communications of information and provisioning of services among users that are connected to network 80. Further still, in some non-limiting embodiments, network 80 may comprise high speed cluster communication technology, such as, for example, Infini-Band.

The application management ecosystem may also include a database 90 which may include, for example, additional servers, data storage, and resources. Monolithic kernel 112 may receive additional data from database 90. Monolithic kernel 112 may also store system performance, system analysis, and any information regarding the network management system on the database 90.

Application management analysis may include examination of network virtual system cells 120, 140, and/or 160, each of which may include a microkernel 122, 142, 162. There may be a large number of network virtual systems, each having its own microkernel. Monolithic kernel 112 may distribute application tasks based on the resources available on each of virtual system cells 120, 140, and 160. Furthermore, a master cell comprising the monolithic kernel 112 may map, in real time, the resource availability, the distributed operating system, the memory capacity, the memory content, etc. of each of a plurality of individual virtual cells or nodes. A master cell may be part of the main system or the distributed operating system, depending on system architecture.

Figure 4:
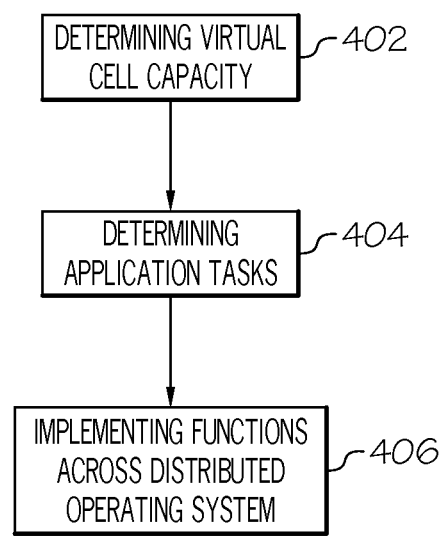
FIG. 4 illustrates a flow chart of a non-limiting embodiment of the present disclosure.

FIG. 4 illustrates a flow chart of a non-limiting embodiment of the present disclosure. In step 402, the monolithic kernel system may determine virtual cell capacity. For example, the monolithic kernel system may determine the resource availability of each virtual cell in the system. In some non-limiting embodiments, each of the virtual cells may comprise a local memory. In addition, the monolithic kernel may determine the architecture of each virtual cell, including microkernel architecture. In step 404, the monolithic kernel system may determine which application tasks are appropriate for each virtual cell, based on the capacity, architecture, and capabilities of each virtual cell. For example, the monolithic kernel system may assign an application task to a virtual cell based on its memory capacity or memory content. In step 406, the monolithic kernel may implement application functions across the distributed operating system on each node of the virtual system. Furthermore, the monolithic kernel system may schedule future application tasks on a plurality of virtual cells or nodes based on the cell's respective memory capacity, memory content, past performance, etc.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in a server diagnostic context, but rather that embodiments of the invention may be used in any transaction having a need to monitor information of any type. The specification and the described examples are considered as exemplary only, with the true scope and spirit of the invention indicated by the following claims.

What is claimed is:

1. A method, comprising:
   receiving a request to deploy an application task from a main operating system on a main system to a distributed operating system, wherein the main system comprises a master cell, wherein the distributed operating system comprises a plurality of individual virtual cells, each individual virtual cell comprising a microkernel architecture and a portion of the distributed operating system, and wherein each individual virtual cell is configured to perform application tasks from the main system;
   detecting, via the master cell, a resource availability of each of the plurality of individual virtual cells;
   determining which of the plurality of individual virtual cells comprises an infrastructure necessary to perform the application task;
   selecting at least one of the plurality of individual virtual cells to perform the application task based on the resource availability and infrastructure of the at least one of the plurality of individual virtual cells; and
   instructing the selected at least one of the plurality of individual virtual cells to perform the application task.

2. The method of claim 1, wherein determining which of the plurality of virtual cells comprises an infrastructure necessary to perform the application task further comprises:
   determining, via the master cell, whether a first virtual cell has a more memory capacity than a second virtual cell, wherein the plurality of individual virtual cells comprises both the first virtual cell and the second virtual cell.

3. The method of claim 1, wherein determining which of the plurality of virtual cells comprises an infrastructure necessary to perform the application task further comprises:
   determining, via the master node, information necessary to run the application task; and
   determining which of the plurality of individual virtual cells stores the information required to perform the application task.

4. The method of claim 1, wherein determining which of the plurality of virtual cells comprises an infrastructure necessary to perform the application task further comprises:
   determining a memory capacity of each of the plurality of individual virtual cells; and
   wherein performing the application task on the selected at least one of the plurality of individual virtual cells further comprises:
   deploying the application task across several of the plurality of individual virtual cells based on the memory capacity.

5. The method of claim 1, wherein the master cell comprises a monolithic kernel architecture.

6. The method of claim 1, wherein the main operating system is located in a physical location and the individual virtual cells are located in a separate location different than the physical location.

7. The method of claim 1, wherein each individual virtual cell comprises identical microkernel architecture.

8. The method of claim 1, further comprising:
   scheduling a future application task on at least one of the plurality of individual virtual cells based on a memory capacity and a past performance of the at least one of the plurality of individual virtual cells.

9. The method of claim 1, further comprising:
   mapping in real time, via the master cell, the resource availability, the portion of the distributed operating system, and a memory content of each of the plurality of individual virtual cells.

10. The method of claim 1, wherein each of the plurality of individual virtual cells comprises a local memory.

11. A system comprising:
    a processing system configured to perform processes comprising:
    receiving a request to deploy an application task from a main operating system on a main system to a distributed operating system, wherein the main system comprises a master cell, wherein the distributed operating system comprises a plurality of individual virtual cells, each individual virtual cell comprising a microkernel architecture and a portion of the distributed operating system, and wherein each individual virtual cell is configured to perform application tasks from the main system;
    detecting, via the master cell, a resource availability of each of the plurality of individual virtual cells;
    determining which of the plurality of individual virtual cells comprises an infrastructure necessary to perform the application task;
    selecting at least one of the plurality of individual virtual cells to perform the application task based on the resource availability and infrastructure of the at least one of the plurality of individual virtual cells; and
    instructing the selected at least one of the plurality of individual virtual cells to perform the application task.

12. The system of claim 11, wherein determining which of the plurality of virtual cells comprises an infrastructure necessary to perform the application task further comprises:
  determining, via the master cell, whether a first virtual cell has a more memory capacity than a second virtual cell, wherein the plurality of individual virtual cells comprises both the first virtual cell and the second virtual cell.

13. The system of claim 11, wherein determining which of the plurality of virtual cells comprises an infrastructure necessary to perform the application task further comprises:
  determining, via the master node, information necessary to run the application task; and
  determining which of the plurality of individual virtual cells stores the information required to perform the application task.

14. The system of claim 11, wherein determining which of the plurality of virtual cells comprises an infrastructure necessary to perform the application task further comprises:
  determining a memory capacity of each of the plurality of individual virtual cells; and
  wherein performing the application task on the selected at least one of the plurality of individual virtual cells further comprises:
  deploying the application task across several of the plurality of individual virtual cells based on the memory capacity.

15. The system of claim 11, wherein the master cell comprises a monolithic kernel architecture.

16. The system of claim 11, wherein the main operating system is located in a physical location and the individual virtual cells are located in a separate location different than the physical location.

17. The system of claim 11, wherein each individual virtual cell comprises identical microkernel architecture.

18. The system of claim 11, further comprising:
  scheduling a future application task on at least one of the plurality of individual virtual cells based on a memory capacity and a past performance of the at least one of the plurality of individual virtual cells.

19. The system of claim 11, further comprising:
mapping in real time, via the master cell, the resource availability, the portion of the distributed operating system, and a memory content of each of the plurality of individual virtual cells.

20. A computer program product comprising:
a computer-readable storage medium having computer-readable program code embodied therewith for execution by one or more processors, the computer-readable program code comprising:
computer-readable program code configured to receive a request to deploy an application task from a main operating system on a main system to a distributed operating system, wherein the main system comprises a master cell, wherein the distributed operating system comprises a plurality of individual virtual cells, each individual virtual cell comprising a microkernel architecture and a portion of the distributed operating system, and wherein each individual virtual cell is configured to perform application tasks from the main system;
computer-readable program code configured to detect, via the master cell, a resource availability of each of the plurality of individual virtual cells;
computer-readable program code configured to determine which of the plurality of individual virtual cells comprises an infrastructure necessary to perform the application task;
computer-readable program code configured to select at least one of the plurality of individual virtual cells to perform the application task based on the resource availability and infrastructure of the at least one of the plurality of individual virtual cells; and
computer-readable program code configured to instruct the selected at least one of the plurality of individual virtual cells to perform the application task.

\* \* \* \* \*